Oct. 20, 1942.  A. J. BEVILLARD  2,299,207
METHOD OF MAKING CUTTING TOOLS
Filed Feb. 18, 1941   2 Sheets-Sheet 1

Inventor
ARTHUR J. BEVILLARD
H. Calvin White
Attorney

Oct. 20, 1942.  A. J. BEVILLARD  2,299,207
METHOD OF MAKING CUTTING TOOLS
Filed Feb. 18, 1941  2 Sheets-Sheet 2
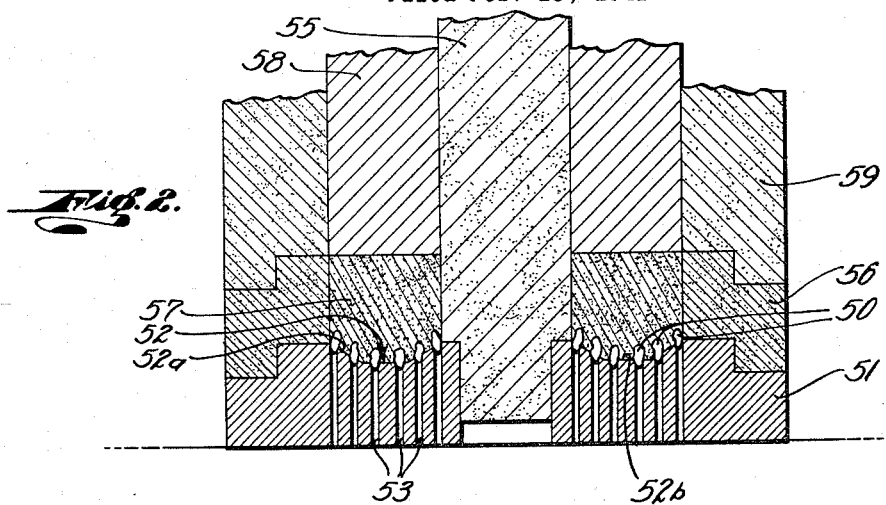
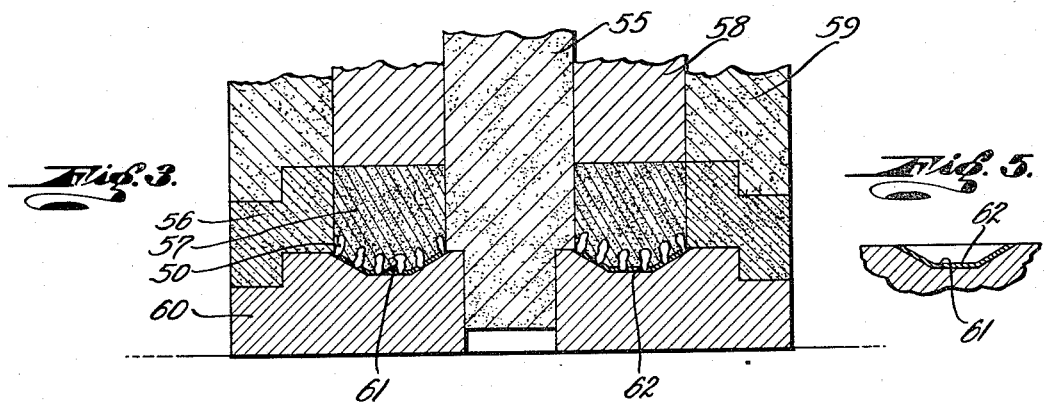 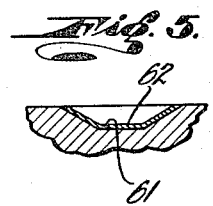
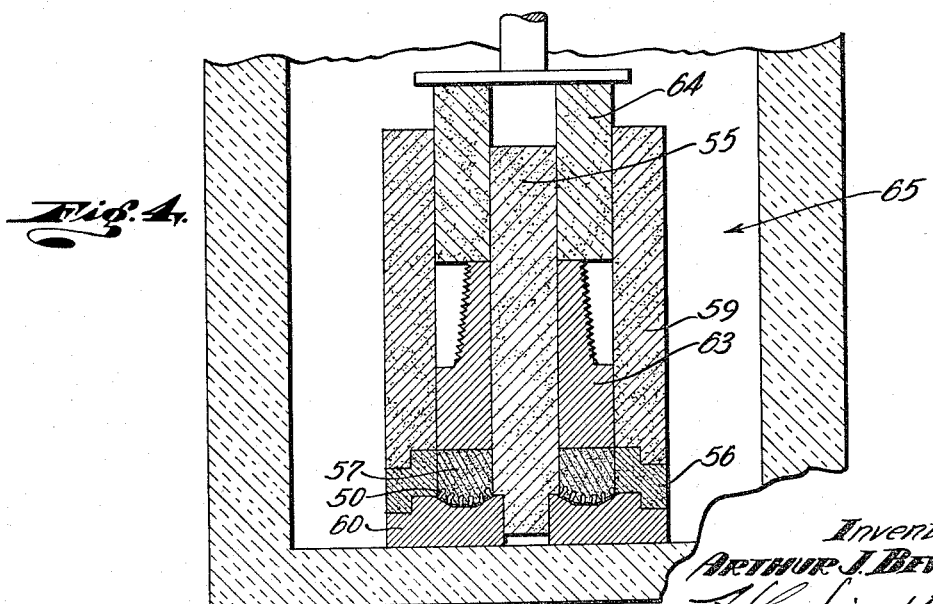

Patented Oct. 20, 1942

2,299,207

UNITED STATES PATENT OFFICE 2,299,207

METHOD OF MAKING CUTTING TOOLS

Arthur J. Bevillard, Anaheim, Calif., assignor to Bevil Corporation, Anaheim, Calif., a corporation of California Application February 18, 1941, Serial No. 379,509

7 Claims. (Cl. 76—108)

This application is a continuation-in-part of my copending application Serial No. 296,785, filed September 27, 1939, now Patent No. 2,240,829.

This invention has to do with the manufacture of cutting and abrading tools, adaptable generally for grinding, drilling or turning operations, and in which the harder cutting edges or surfaces are presented by individual cutting elements retained in a matrix of suitable metal or metallic alloy. While in certain of its broad aspects the invention contemplates the use of any suitable hard cutting elements, for example fused aluminum oxide, silicon carbide, metallic carbides, boron compounds or alloys, in other and more specific aspects the invention is concerned with improvements in the manufacture of diamond cutter tools. The invention therefore will be described with that objective in view, both as a typical embodiment of those broad aspects and an illustrative adaptation specifically of diamond tool manufacture. Cutting tools of the present type may be described generally as comprising diamond cutting elements embedded in and projecting out of the cutting face of a metallic matrix, the composition of which may be selected in accordance with the work to be done by a particular tool, and to provide a desirably hard and tough carrier for the diamonds. As illustrative, the invention may be described with reference to cutting tools of the type more specifically dealt with, as to the bonding relationship between the cutting elements and matrix, in Patent No. 2,240,829, issued May 6, 1941, to me on Method of making cutting tools. In such tools where the diamonds project out of or are presented at the cutting face of the matrix, it is particularly important that the working load, or pressure of the diamonds against the work, be uniformly distributed among the individual cutting elements; and to this end, assuming the working face of the matrix to have a predetermined shape or contour, that the cutting elements project accurately uniform distances beyond this face. It is with improved methods for embedding the diamonds in the matrix, and for assuring the important uniformity in the projections of the diamonds out of the matrix, that the present invention is primarily concerned.

In distinction to past practices, I first embed the diamonds in the matrix metal, and in accurately determinable arrangement where definite individual and relative placements of the diamonds may be desirable. This first operation thus assures proper location, distribution, and orientation of the diamonds within the matrix. Then, in order to assure accurate uniformity in the distances which the diamonds project out of the matrix, I apply the diamonds and matrix to a surface or die covered with a layer of investing material of uniform thickness and capable of penetration by the diamonds into contact with the die surface. By virtue of the displaceability of the diamonds in the matrix, as yet unfused or unsintered, the points of all the projecting diamonds may be brought into engagement with the die surface and into positions of uniform projection out of the matrix, by reason of the spacing function of the investing material. The matrix then is in condition to be heated to cause the metal to bond against and permanently contain the diamonds. As will later appear, final uniformity in the projections of the diamonds out of the matrix, may be assured by maintaining the diamonds and matrix against the die surface and investing material during heating of the matrix and until it permanently bonds to the diamonds.

The invention will be understood to better advantage without further preliminary discussion, from the following detailed description, throughout which reference is made to the accompanying drawings showing a typical form of apparatus for casting the tools. In the drawings:

Figs. 2, 3 and 4 are views showing progressive steps in the casting of the tool by a modification and improvement of the method illustrated by Fig. 1; and Fig. 5 is a fragmentary view showing the coating of investing material on the diamond alining surface of the pressure die.

Figure 1:
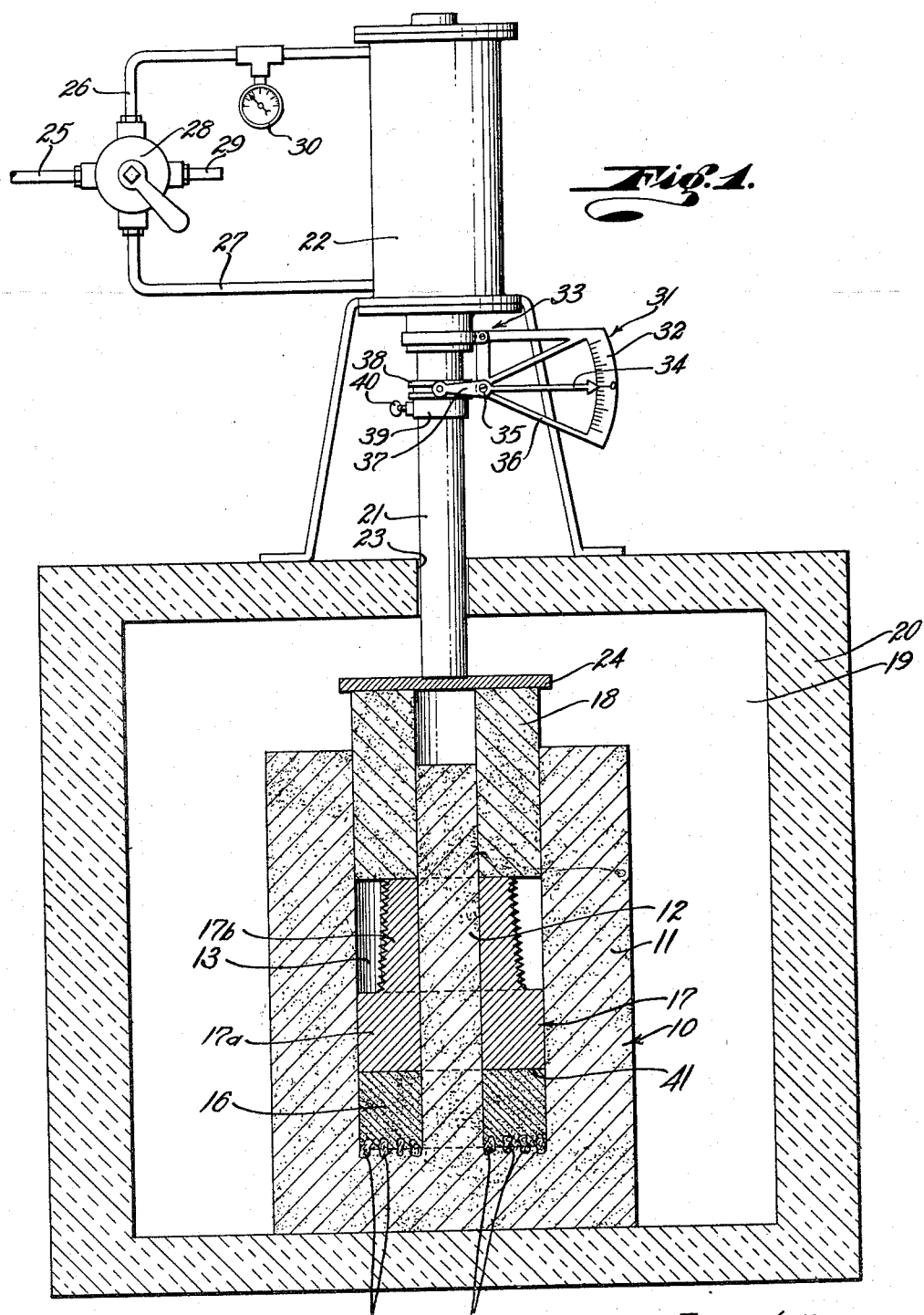
Fig. 1 is an elevational view of the apparatus showing the furnace, mold and its contents, in vertical section.

In using the apparatus of Fig. 1, I first prepare a suitable mold of refractory material, the shape and contour of the mold conforming to the desired contour of the completed tool. The mold may be made of any suitable refractory material such as silica, clay mixtures or graphite, although for general purposes graphite is preferred. The typical form of mold 10 shown in the drawings is shaped to form a circular diamond drill, and comprises a body 11 and a central core 12 annularly spaced at 13 from the body, the entire mold being made of graphite compressed or otherwise integrated sufficiently to retain its form and shape. The cutting elements 14, typically individual diamonds, are placed in depressions or cavities 15 in the mold material at the bottom of space 13, and a suitable quantity of powdered matrix metal 16 is filled into the space directly upon the diamonds 14. A suitable plunger, not shown, is then fitted into the mold and pressed against the metallic powder 16 under sufficient pressure to cause the metal to intimately contact the diamonds 14 and to fill, in a more or less compact mass, the bottom portion of space 13.

After removing the plunger, a tubular shank or body portion 17 of the tool is inserted in the mold, as illustrated, the body 17 being shown typically as having a cylindric head portion 17a and a threaded pin 17b adapted to be screwed into the box section of a drilled rod joint. A tubular plunger 18 of refractory material is inserted in the mold against the upper end of the tool body 17, and the filled mold is then placed in the heating chamber 19 of a suitable furnace diagrammatically illustrated by the walls 20.

Suitable provision is made for applying pressure to the powdered metal 16 while it is being heated, such means being shown typically as comprising a plunger rod 21 operated by a piston in the air cylinder 22, and extending through an opening 23 in the top wall of the furnace to bear against a refractory disc 24 placed on the top of plunger 18. Compressed air is delivered to cylinder 22 from a supply line 25, selectively through line 26 or line 27 under control of a four way valve 28, which also controls the exhaust to line 29. The downwardly applied air pressure on plunger 21, and therefore the compression pressure applied to the metal 16, is indicated by a suitable pressure gauge 30. Slight downward movements of the plunger 21 are shown by a suitable indicator 31, which may consist typically of a scale quadrant 32 stationarily mounted at 33 on the lower end of the cylinder 22, and an indicator arm 34 pivoted at 35 on the quadrant frame 36 and actuated by an integral arm 37 engaged within a ferrule 38 on the plunger 21. The indicator 34 may be centered or given any other suitable position on the scale 32, at any position of the plunger 21, by vertical adjustment of a sleeve 39 integral with the ferrule 38 and held in position on the plunger by set screw 40.

The mold and its contents are heated in an inert or reducing atmosphere, as may be provided by introducing to the heating chamber 19 a suitable gas, e. g., coal gas, natural gas, hydrogen, or a gaseous alcohol or hydrocarbon. By heating in a neutral or reducing atmosphere I avoid oxidation of the metals and diamonds at high temperatures, and also prevent the formation of oxidized films between the matrix 16 and diamonds 14, and between the matrix and bottom surface 41 of the tool body, that would otherwise weaken the bonds between them.

The mold assembly is heated in the furnace to a temperature sufficiently high to bring the powdered matrix metals 16 to at least a state of incipient plasticity, at which the metals will flow under the applied pressure, and preferably to a state of complete fluidity, in which the metals become completely liquid and form an alloy solution. The alloy composition 16 is selected, with reference to its melting point, so that the maximum required temperature will be below that at which the diamonds will become injured, and also below a temperature at which the shank or body 17 of the tool will become melted or deformed. In this connection, it may be mentioned that the tool body may be made of any metal or alloy capable of forming a bond with the matrix alloy 16, but having a melting point sufficiently high to prevent its being deformed during the casting process. In a tool of the particular form illustrated, I prefer to make the body 17 of iron or mild steel. In casting the matrix alloy about diamond cutting elements, the maximum temperature should not exceed 1600° C., and preferably is maintained between 1150° C. and 1400° C.

As the mold and its contents are being heated, plunger 21 is set to maintain a suitable pressure on the alloy 16. This pressure need not be great, but only sufficient to cause the alloy, when heated to its melting point, to collapse gas pockets or voids in the metal 16 when it reaches its melting temperature, and to cause the metal to conform accurately to the mold shape and flow against or assume intimate contact with the cutting elements 14 and the bottom surface 41 of the tool body. Pressures on the metal 16 of around 25 to 30 lbs. per sq. in., and as low as 5 lbs., have given satisfactory results in producing a nonporous cast matrix bonded intimately to the diamonds and tool body.

Before the matrix alloy has become heated to its melting temperature, the plunger movement indicator 34 is set at some suitable index point on the scale 32. By thereafter closely observing the indicator 34, it is possible to determine immediately when the alloy 16 reaches melting temperature and converts to liquid form. At this point, plunger 21 is observed to move comparatively rapidly, and almost instantaneously, downward a short distance, which movement is indicated by rapid swinging of the indicator 34. Since the diamonds 14 have considerably lower specific gravity than the molten alloy 16, there may be a tendency for the diamonds to loosen from the mold recesses 15 and float upwardly within the metal. To prevent such displacement of the diamonds, the heat supply to the furnace is discontinued, as by cutting off the current where an electric furnace is used, immediately upon the observed sudden downward movement of plunger 21 indicating that the melting temperature of the alloy has been reached. The alloy thereupon quickly solidifies and retains the diamonds in proper position in the bottom cutting surface of the tool. Sometimes it may be desirable to cut off the furnace heat just as soon as the indicator shows that the alloy has become well started in its melting process, thereby allowing the residual heat in the furnace to completely melt the alloy, but causing the alloy then to solidify very soon afterwards because of the early interruption of the heat supply.

As previously mentioned, microscopic observations of diamonds about which the matrix alloy has been cast as described, show tiny surface depressions indicating that a chemical reaction has taken place between the diamonds carbon and the metal alloy. As a result of this reaction, localized portions of the alloy at the diamond surfaces are carbonized, thus creating a chemical affinity between the matrix and diamonds, and a physical interlock is formed by the surface depressions in the diamonds becoming filled with the metal, and also by shrinkage of the diamonds about the metal filling those depressions.

The invention contemplates broadly the use of any suitable metal or combination of alloy metals, to form the cutter element matrix. In general, the matrix composition will be selected in accordance with the particular type of tool being made and the purposes for which it is to be used. Taking for example a core drill of the illustrated form for use in diamond drilling, the matrix composition may be predetermined to best suit the conditions under which the drill is to be operated, and preferably will comprise selected alloy metals possessing the property of adhering to the surface of the diamonds to prevent them from loosening and falling out after the matrix is worn away below the equator of the diamonds. Also the matrix must have the necessary strength and abrasion resistant properties to prevent fracture and wearing away at such a rate as to expose the diamonds too rapidly. As a typical alloy suitable for average diamond drill operation and capable of adhering to the surface of the diamonds as described in the foregoing, I may use a powdered mixture of copper, 30% to 60%, nickel 60% to 30%, and minor percentages of precipitation hardening agents such as iron, silicon (e. g., ferro silicon or nickel silicon), chromium, titanium, manganese, beryllium, aluminum or boron. Particularly good results have been obtained using an alloy having a melting point around 1250° C., and composed of 47.5% copper, 47.5% nickel, 3% chromium, and 2% silicon, the percentages being by weight. Cobalt may be used in place of nickel, although the latter is preferred because of the lower melting temperature of the nickel alloy composition, also the superior affinity of this alloy for the diamonds, and the ability of the ingredients to form solid alloy solutions in all proportions.

Use of these diamond bits in drilling operations has established the importance of maintaining an accurately uniform relationship between the exposed ends of the diamonds and the cutting face contour of the bit. It is important that the cutting work and drilling pressure be distributed uniformly on the diamonds, and that no one diamond or certain diamonds be subjected to excessive strains or impacts by reason of such diamond or diamonds being irregularly positioned with relation to the cutting face of the tool, or permitted to project excessively or unevenly out of the cast matrix. Where unevenness in the diamond positions occurs, the usual result is that the furthest projecting diamonds soon become fractured and broken away, causing not only impairment of the life and cutting efficiency of the bit, but also loss of valuable stones. According to the method illustrated in Figs. 2 to 5, the matrix is cast against the diamonds in a manner assuring final retention and positioning of the diamonds with uniformity in their relation to the cutting face contour of the tool, and with exact or close uniformity within permissible tolerances, in the distances which the diamonds project out of the matrix.

The diamonds 50 first may be placed and retained in any desired manner in a suitable holder, shown typically as a setting die 51 having a concave annular recess 52 which may be of any desired cross-sectional shape in accordance with the contour to be given the cutting face of the tool. Typically, this contour is shown to be formed by inclining the recess side surfaces 52a at about 30°, and connecting them by a horizontal base surface 52b. The diamonds 50 are placed in the die substantially as shown, with their points or ends seated within suitable cavities, shown typically as bores 53 drilled through the annular portion of the die defined by recess 52 and spaced according to the desired diamond distribution within the matrix. The diamonds may suitably be retained in bores 53, as by applying to the diamonds a cement or adhesive. Core piece 55 having been inserted and a retaining or molding ring 56 placed on the die as illustrated, the alloy metal 57 is filled into the space between the core piece and ring 56, and the metal is firmly compacted against the diamonds and the concave die surface by pressure or tamping exerted on the tubular piece 58. The mold wall may be built up by the addition of section 59 which may be a part of the final mold assembly as seen by reference to Fig. 4. In order to secure proper adhesion of the finally divided matrix metals, the alloy before being compacted, is mixed with a sufficient proportion of the usual dampener or lubricant to enable the alloy to retain its form and body after being compacted.

After thus initially imbedding the diamonds in the alloy metal, the setting die and base 53 are replaced by a pressure die 60, as shown in Fig. 3. This die has a continuous annular recess 61 corresponding in shape to recess 52 in the setting die. Before insertion in the mold assembly, the surface of recess 61 is coated with a layer of investing material, the purpose of which is to provide between the metallic surface of the recess and the alloy 57, a medium which will permit the diamonds to be pressed against the die surface, and therefore into positions such that the projecting ends of the diamonds are brought into a plane or contour shape corresponding to the configuration of the recess, while preventing the metal 57 from being pressed against the die surface. This coating or investing material may be of any suitable composition capable of retaining its thickness and body during the casting operation without interference with the alloy by chemical combination, or otherwise, and which later may readily be removed to leave the exposed ends of the diamonds projecting uniform distances out of the matrix. Typically, the investing material may consist of pulverized silica, a small percentage of a suitable colloid, such as tannic acid, and sufficient binder such as sodium stearate in alcohol, to unify the mass. This material is sprayed or otherwise applied to the die surface 61 in a layer 62 which may have any desired thickness, usually between 0.010 to 0.015 inch.

After permitting the investing material to dry, the pressure die is placed in position as shown in Fig. 3 and pressure is again exerted through plunger 58 to cause the diamonds to penetrate through layer 62 into engagement with the die surface 61. By this operation, the unevenness that exists in the relationship of the diamond points to the shape of the die surface, and the variances in the distance which the diamonds project out of the matrix, are corrected to a condition of accurate uniformity by bringing the diamonds to engage the die surface while keeping the matrix uniformly spaced from that surface by the presence of layer 62.

Plunger 28 may now be removed, the tool body 63 inserted on top of the matrix alloy, and the same or a shorter plunger 64 put into the mold. The mold and its contents are inserted in the furnace 65 and the casing operation carried out as previously described in detail with reference to Fig. 1. After the bit is cast and taken from the mold, the layer 61 of investing material may be removed to leave the diamonds projecting with accurate uniformity out of the matrix metal.

I claim:

1. The method of making cutting tools that includes, embedding hard cutting elements in a body of matrix metal with portions of said elements projecting out of the metal, applying to a die surface a layer of investing material, and pressing said cutting elements while held in the matrix metal against said layer to cause the elements to penetrate the layer and engage the die surface.

2. The method of making cutting tools that includes, placing hard cutting elements in contact with a holder and embedding the elements in a body of matrix metal with portions of said elements projecting out of the metal, removing the elements and matrix metal from said holder, applying to a die surface a layer of investing material, and pressing said cutting elements and metal against said layer to cause the elements to penetrate the layer and engage the die surface.

3. The method of making cutting tools that includes, placing hard cutting elements within openings in a holder and embedding the elements in a body of matrix metal with portions of said elements projecting out of the metal, removing the elements and matrix metal from said holder, applying to a die surface a layer of investing material, and pressing said cutting elements and metal against said layer to cause the elements to penetrate the layer and engage the die surface.

4. The method of making cutting tools that includes, placing hard cutting elements in contact with a holder, compressing a body of pulverulent matrix metal against said elements and holder to cause the elements to become embedded in the matrix metal with portions of the elements projecting out of the metal, removing the elements and matrix metal from said holder, applying to a die surface a layer of investing material having substantially uniform thickness, and pressing said cutting elements and metal against said layer to cause the elements to penetrate the layer and engage the die surface.

5. The method of making cutting tools that includes, placing hard cutting elements within individual apertures in a holder, compressing a body of pulverulent matrix metal against said elements and holder to cause the elements to become embedded in the matrix metal with portions of the elements projecting out of the metal, removing the elements and matrix metal from said holder, applying to a die surface a layer of investing material having substantially uniform thickness, and pressing said cutting elements and metal against said layer to cause the elements to penetrate the layer and engage the die surface.

6. The method of making cutting tools that includes, embedding hard cutting elements in a body of matrix metal with portions of said elements projecting out of the metal, applying to a die surface a layer of investing material, pressing said cutting elements while held in the matrix metal against said layer to cause the elements to penetrate the layer and engage the die surface, heating said die, cutting elements and matrix metal in a furnace to cause the metal to fuse, and cooling the metal to cause it to bond to said cutting elements.

7. The method of making cutting tools that includes, placing hard cutting elements in contact with a holder, compressing a body of pulverulent matrix metal against said elements and holder to cause the elements to become embedded in the matrix metal with portions of the elements projecting out of the metal, removing the elements and matrix metal from said holder, applying to a die surface a layer of investing material having substantially uniform thickness, pressing said cutting elements and metal against said layer to cause the elements to penetrate the layer and engage the die surface, heating said die, cutting elements and matrix metal in a furnace to cause the metal to fuse, and cooling the metal to cause it to bond to said cutting elements.

ARTHUR J. BEVILLARD.